US006457436B1

(12) United States Patent
Truebe et al.

(10) Patent No.: US 6,457,436 B1
(45) Date of Patent: Oct. 1, 2002

(54) PADDLEWHEEL FISH DETERRENT AND GUIDE

(76) Inventors: Jonathan P. Truebe, 4 Tuftonboro Neck Rd., Mirror Lake, NH (US) 03853; Eric P. Truebe, 4 Tuftonboro Neck Rd., Mirror Lake, NH (US) 03853

(*) Notice: Subject to any disclaimer, the term of this patent is extended or adjusted under 35 U.S.C. 154(b) by 0 days.

(21) Appl. No.: 09/425,866

(22) Filed: Oct. 23, 1999

(51) Int. Cl.[7] .............................................. A01K 61/00
(52) U.S. Cl. ..................................................... 119/219
(58) Field of Search .......................... 43/17.1; 119/219; 440/48; 405/63, 80, 84; 367/139; 261/90, 29; 210/242.1, 242.2

(56) References Cited

U.S. PATENT DOCUMENTS

| | | | | |
|---|---|---|---|---|
| 181,336 A | * | 8/1876 | Hartzell ................... 210/242.1 |
| 2,826,897 A | * | 3/1958 | Vinsonhaler et al. ......... 405/81 |
| 3,561,738 A | * | 2/1971 | Galeano ................. 210/242.2 |
| 3,595,538 A | * | 7/1971 | Baumann ................ 210/242.2 |
| 3,618,768 A | * | 11/1971 | Brown .................... 210/242.1 |
| 3,675,779 A | * | 7/1972 | Grutsch et al. .......... 210/242.2 |
| 3,747,904 A | * | 7/1973 | Gross ........................ 119/226 |
| 3,759,495 A | * | 9/1973 | Boler et al. ............. 210/242.2 |
| 3,799,515 A | * | 3/1974 | Geerlings ................... 261/120 |
| 3,852,384 A | * | 12/1974 | Bearden ................... 210/242.2 |
| 3,960,991 A | * | 6/1976 | Schmitt et al. ............... 261/92 |
| 4,190,619 A | * | 2/1980 | Cherne .................... 210/242.2 |
| 4,196,087 A | * | 4/1980 | Gordon ................... 210/242.3 |
| 4,409,107 A | * | 10/1983 | Busch ........................ 210/242 |
| 4,539,112 A | * | 9/1985 | Durot et al. ................ 210/219 |
| 4,776,112 A | * | 10/1988 | Urbani .................... 210/242.1 |
| 4,808,305 A | * | 2/1989 | Arnold ....................... 210/170 |
| 4,976,855 A | * | 12/1990 | Virtanen ................... 210/242.3 |
| 5,104,589 A | * | 4/1992 | Palmer et al. ........... 210/242.2 |
| 5,106,492 A | * | 4/1992 | Distinti et al. ................ 15/1.7 |
| 5,116,501 A | * | 5/1992 | House ..................... 210/242.2 |
| 5,136,174 A | * | 8/1992 | Simoni ........................ 290/43 |
| 5,263,833 A | * | 11/1993 | Robinson et al. ............. 405/80 |
| 5,478,208 A | * | 12/1995 | Kasai et al. ................... 417/53 |
| 5,667,337 A | | 9/1997 | Lazes ........................... 405/63 |
| 5,730,086 A | | 3/1998 | Truebe ....................... 119/219 |
| 5,954,362 A | * | 9/1999 | Aota et al. ................... 280/777 |
| 6,102,619 A | * | 8/2000 | Truebe et al. ............... 119/219 |
| 6,117,336 A | * | 9/2000 | Sachse ........................ 210/156 |
| 6,238,559 B1 | * | 5/2001 | Heyek ..................... 210/242.1 |

OTHER PUBLICATIONS

Carlson, T.J., Nov. 1994, Use of Sound for Fish Protection at Power Production Facilities.
Coutant, C.C., Jul. 1998, Turbulent Attraction Flows for Juvenile Salmonid Passage at Dams.
Brett & Alderdice, 1958, Research on guidign young salmon at two Britich Columbia field stations; pp. 29–36.

* cited by examiner

Primary Examiner—Charles T. Jordan
Assistant Examiner—Jordan M Lofdahl
(74) Attorney, Agent, or Firm—Mesmer & Deleault, PLLC

(57) ABSTRACT

An improved fish deterrent and guide, utilizing generally a paddlewheel (1) consisting of a central shaft (10) with vanes (12) to create a behavioral modifier. When paddlewheel (1) is rotated, the action of the vanes striking the water creates water particle motion (low frequency sound or infrasound), turbulence and current, as well as visual cues that fish avoid. The device is tunable for different fish species and life stages by adjustment of vane style, spacing, and paddlewheel rotation speed. The use of multiple behavioral deterrents creates a measure of reliability in the system. Another advantage is that this fish deterrent provides a continuous lead, which is more effective than typical point-source turbulence and sound generators. Typically, the paddlewheel fish deterrent and guide is positioned at the water surface across the intake to a power plant intake to deter surface oriented downstream migrating fish, and guide them to a bypass. In this configuration floating debris is also guided through the bypass. Alternatively, the paddlewheel may be positioned at a subsurface elevation to guide non surface oriented fish to the bypass, or positioned across the tailrace to guide upstream migrating fish to a fishway entrance.

13 Claims, 5 Drawing Sheets

PADDLEWHEEL FISH DETERRENT AND GUIDE

BACKGROUND—FIELD OF THE INVENTION

This invention relates to modifying the behavior of fish. Specifically, it modifies fish behavior by using oscillating water particle acceleration, visual cues, and water currents.

BACKGROUND—DESCRIPTION OF PRIOR ART

Systems have been designed and installed to deter or guide fish from certain underwater areas. These areas include water intakes for hydroelectric power plants, municipal water intakes, thermal power plants, and irrigation systems. Fish can suffer high mortalities when they come in contact with pumps or turbines, when they are subject to temperature variations induced by plants, or when they are pumped through irrigation systems and discharged onto fields.

These systems used to deter or repel fish can be broken down into two categories: physical barriers and behavioral deterrents. These devices and their advantages and disadvantages are described in Taft, E.P. 1986. *Assessment of Downstream Migrant Fish Protection Technologies for Hydroelectric Application.* Stone and Webster Engineering Corporation. Electric Power Research Institute, Palo Alto, Calif. Physical barriers work by limiting the opening size of the plant intake such that a certain fish species or life stage of fish cannot enter. This includes barriers such as closely spaced bar racks, traveling screens, and fixed screens. The disadvantages of these structures are that they are difficult and expensive to construct and maintain. They can also limit the flow of water into the intake, thereby limiting power production or quantity of water available. These structures can also result in impingement of fish on the intake.

This patent is in the behavioral deterrent category. Behavioral deterrents generate certain stimuli of which fish are known to respond, and utilize these stimuli to deter or repel fish from certain areas. Known systems have employed such devices as underwater lights, electric fields, water current/turbulence generators, visual leads such as traveling cables, and sound generators. Underwater lights (including strobes) are species-specific, and the visibility of lights, and therefore their effectiveness, is reduced in turbid water. Major concerns with underwater electric fields include a concern for human safety, the variability of the field strength depends on the conductivity of water and the length of the fish, and the fact that the field strength that is effective for some fish species may be lethal to other species.

Recently, mechanically generated water currents have been used as both a deterrent to fish and to mimic the natural water current in the river. The use of mechanically generated water currents and turbulence to guide fish is summarized in Coutant, C.C. 1998. *Turbulent Attraction Flows For Juvenile Salmonid Passage at Dams.* Oak Ridge National Laboratory, Oak Ridge, Tenn. The use of water current and turbulence generators as a deterrent, such as air bubble curtains and water jets, is usually energy intensive and doesn't affect some species. Mechanically generated currents used to mimic natural river currents guide fish by creating a predominant surface current (for surface-oriented fish) across the plant intake to the area of a fish bypass. Therefore, this current has to compete with the variable river currents. It is sometimes difficult to establish this continuous lead over long distances with multiple current generators without creating gaps in the current.

Visual cues can be an effective behavioral deterrent. J. R. Brett, and D. F. Alderdice documented the use of traveling hanging cables to direct fish movement in *Research on Guiding Young Salmon at Two British Columbia Field Stations.* Fisheries Research Board of Canada, Ottawa, 1958. Although this showed promise, there are operational problems with the system because debris in the river is likely to get tangled in the cables. Water clarity is also important with this system.

Sound is an additional means of modifying the behavior of fish. An overview of the current state of the art sound deterrent systems is provided in Carlson, T. J. 1994. *Use of Sound for Fish Protection at Power Production Facilities: A Historical Perspective of the State of the Art.* Battelle, Pacific Northwest Laboratories. U.S. DOE Bonneville Power Administration, Portland, Oreg.

There are several disadvantages to recent sound deterrent systems. One of the disadvantages of underwater sound deterrents is that it is difficult to establish an uninterrupted barrier, and thus create a continuous lead for fish to follow away from the power plant intake area. Also, the frequency and amplitude of the sound wave must be tuned for each individual species, and even life stage, of fish. Underwater sound systems may be categorized into either high frequency systems or low frequency water particle motion or infrasound systems, depending on the specific species of fish to control. Low frequency sound systems have been proven to elicit an avoidance response in Atlantic salmon smolts, Atlantic cod, and perch in Knudsen, F. R., P. S. Enger, and O. Sand. 1992 *Awareness Reactions and Avoidance Responses To Sound in Juvenile Atlantic Salmon Smolt, Salmo salar L.* Journal of Fish Biology. 40: 523–534. To be effective, a sound deterrent must be able to create the same sound repeatedly for extended periods of time without breakdown. The problems the Sand system developed were that it was not mechanically reliable and that it involved the risk of electric shock. Other sound deterrents developed since then are more reliable but have difficulty creating a continuous barrier to the fish because the sound generators are at point sources, such as U.S. Pat. No. 5,730,086 issued to Truebe. Also, it has been shown in certain instances that a strong background noise (white noise), such as that due to turbine operation, can blanket over the effect of the sound deterrent. Without any additional deterrent, the fish are free to enter possibly hazardous areas.

OBJECTS AND ADVANTAGES

Accordingly, several objects and advantages of my invention are:

To provide a cost effective fish deterrent and guide.

To provide a fish deterrent and guide that incorporates multiple behavioral deterrents to increase effectives.

To provide a fish deterrent and guide that is adjustable for different site conditions.

To provide a fish deterrent and guide that will facilitate routine plant operations by bypassing trash around the plant intake.

To provide a fish deterrent and guide which keeps fish in their river environment to reduce disease transmission and boost public relations.

To provide a fish deterrent and guide which improves the river conditions for migrating fish.

To provide a continuous fish deterrent and guide.

To provide a fish deterrent and guide that will assist upstream migrating fish in finding a fishway entrance.

To provide a fish deterrent and guide that increases fish bypass effectiveness by reducing the velocity gradient in the fish bypass entrance area.

Further objects and advantages of the invention will become apparent from a consideration of the drawings and ensuing description.

DESCRIPTION OF THE DRAWINGS

FIG. 3 contains side views of paddlewheel fish deterrent and guide segments illustrating different vane types.

REFERENCE NUMERALS IN DRAWINGS

| | | | |
|---|---|---|---|
| 1 | Paddlewheel Device | 10 | Central Shaft |
| 12 | Vanes | 14 | Flat Plate |
| 16 | Spokes | 18 | Water Surface |
| 20 | Universal Joint | 22 | Power Source |
| 24 | Dam | 26 | Turbine |
| 28 | Turbine Intake | 30 | Fish Bypass |
| 32 | Suspension Rope | 34 | Float |
| 36 | Vertical Positioning Rail | 38 | Current |
| 40 | Turbulence and Sound Field | 42 | Shore |
| 44 | Upstream Fishway Entrance | 46 | Upstream Migrating Fish |
| 48 | Tailrace | | |

SUMMARY

This invention is a behavioral deterrent to exclude fish from potentially dangerous areas. It consists of an elongated paddlewheel that is positioned across the area from which fish are to be excluded. As the paddlewheel is rotated, the effect of the vanes hitting the water surface creates a behavioral deterrent to fish. The deterrent works in three ways; it creates a visual clue to the fish, the sound of the vanes hitting the water surface creates a sound deterrent, and the rotation of the vanes through the water create current and turbulence in the water.

DESCRIPTION OF THE INVENTION

Figure 1:
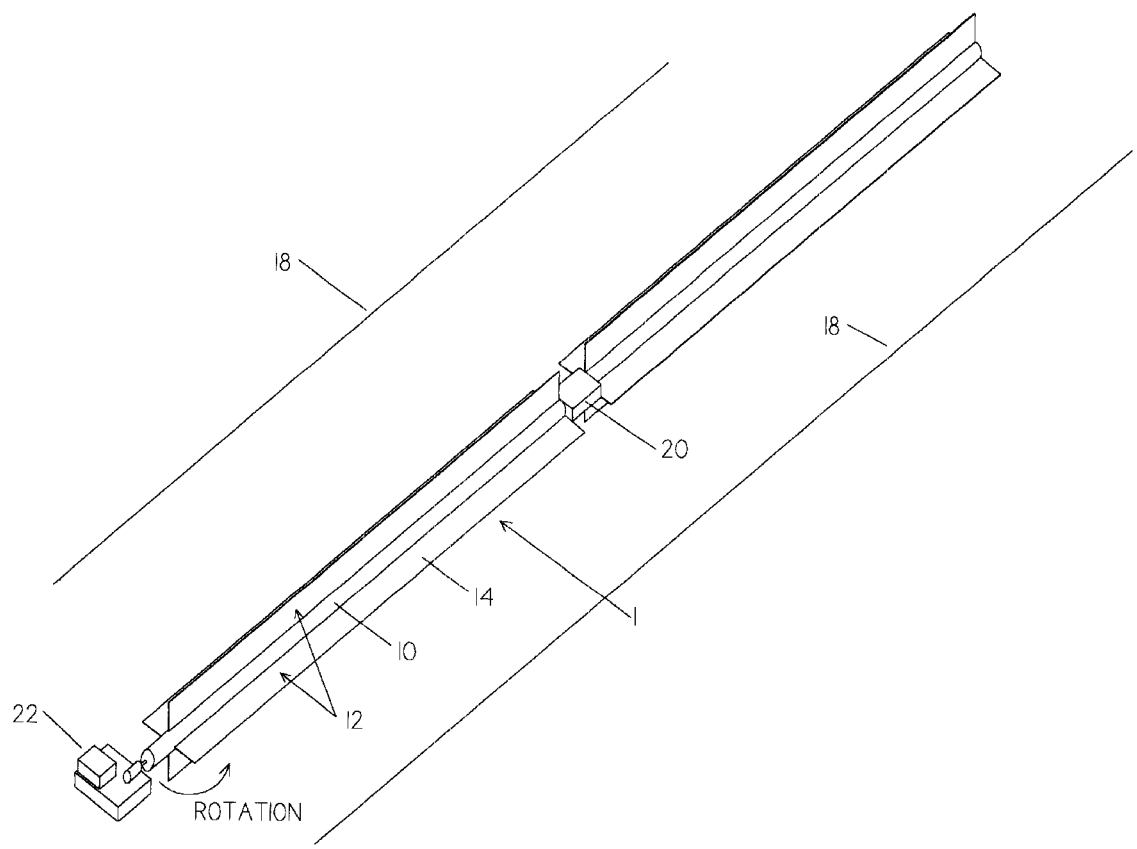
FIG. 1 is a perspective view of the paddlewheel fish deterrent and guide with solid vanes.

FIG. 1 shows a perspective view of the present invention, a paddlewheel fish deterrent and guide. A paddlewheel 1 is comprised of a central shaft 10, extending from which is a series of vanes 12. Each vane 12 is constructed of a flat plate 14 extending out along the length of central shaft 10 in a manner similar to a conventional waterwheel. Alternatively, this plate may be curved to improve the hydrodynamics of paddlewheel 1. Paddlewheel 1 is of sufficient buoyancy or is suspended from an adjacent structure such that the midpoint of shaft 10 is located at water surface 18. Paddlewheel 1 is constructed short enough to facilitate handling. Sufficient numbers of sections of paddlewheel 1 are connected to one another to span the hydroelectric intake area. Power transmission between the sections of paddlewheel 1 is achieved by a universal joint 20. Construction materials for central shaft 10 and vanes 12 may be of any material that is neutrally buoyant and has sufficient rigidity to transmit the torque provided at a power source 22 to vanes 12 and water surface 18. Polyethylene pipe and sheet stock is recommended due to its buoyancy, durability and noncorrosive properties. Flat plate 14 may be cut from plastic sheet stock and thermoplastically welded to central shaft 10. If negatively buoyant materials are used, floatation may be added to central shaft 10. Power source 22 used to rotate shaft 10 may be located at any point in the system between sections of paddlewheel 1. Power source 22 may be of electric, hydraulic, or pneumatic power. Power source 22 used to rotate the paddlewheel should have a variable output to change the speed of its rotation. This enables tuning both the frequency of the sound output and the intensity of the turbulence so as to obtain the greatest effect for the desired species and life stage of migrating fish.

Figure 2:
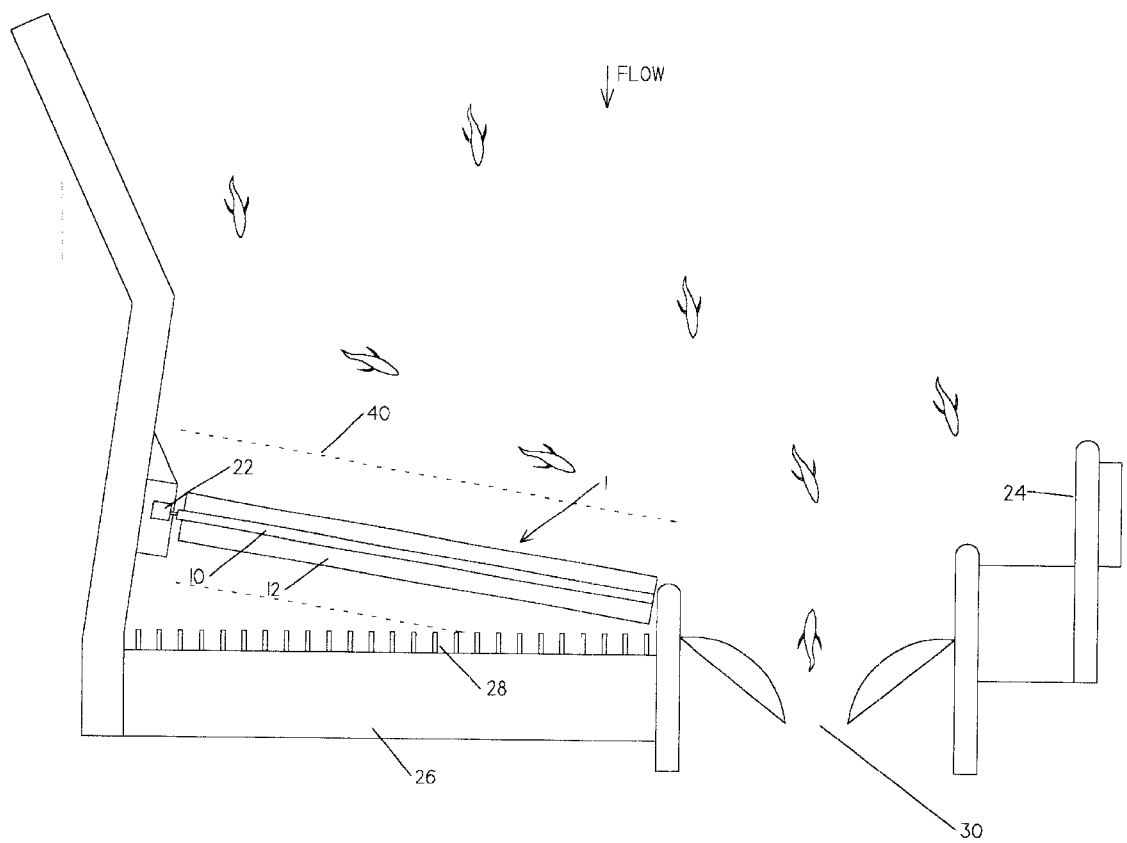
FIG. 2 is a plan view of the paddlewheel fish deterrent and guide in operation at a hydroelectric plant intake.

A typical embodiment of the paddlewheel fish deterrent and guide is shown in FIG. 2. In this embodiment, the invention is used in conjunction with a hydroelectric site that includes a dam 24 and a turbine 26. Paddlewheel 1 is positioned across turbine intake 28 and leads to a fish bypass 30. Rotation of paddlewheel 1 creates a visual deterrent as well as a turbulence and sound field 40 such that the fish are excluded from and not endangered by the turbine operation.

OPERATION OF THE INVENTION

The paddlewheel fish deterrent and guide commences operation when the shaft is rotated and the attached vanes rotate in and out of the water. The action of the vanes striking the water surface creates a low frequency underwater sound. Certain species of fish, such as salmonids, have been shown to elicit an avoidance response to low frequency sounds. In addition, as the vanes rotate through the water, they create a visual deterrent as well as movement in adjacent water particles. This movement of water particles causes a zone of turbulence in the water around the paddlewheel. Turbulence has been shown to be an effective means of modifying the behavior of migrating fish.

Figure 3A:
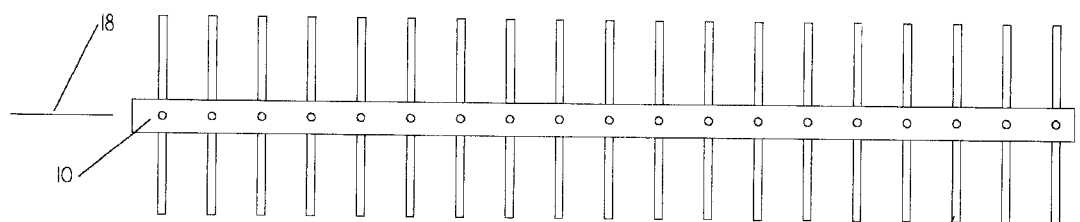
FIG. 3A shows spoked vanes.

A number of vane designs are shown in FIG. 3 to highlight the affect of certain behavioral deterrents. Rather than flat plate 14 being used for vanes 12, FIG. 3A shows spokes 16 extending outward from central shaft 10. The use of spokes 16 increases the visual effect of the paddlewheel device 1. This emulates the visual deterrent and lead made with traveling cables, without the associated maintenance problems. Spokes 16 may consist of lengths of pipe or flatbar with a smaller cross-section than central shaft 10, extending through central shaft 10 and welded to central shaft 10.

Figure 3B:
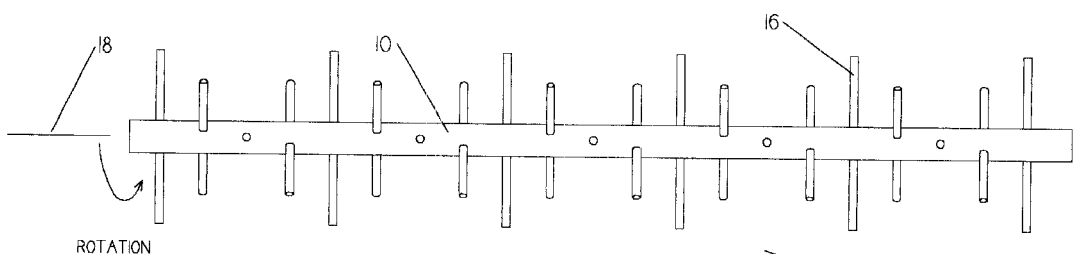
FIG. 3B shows spoked vanes in a spiral pattern.

FIG. 3B shows spokes 16 as well, but positioned in a spiral manner about central shaft 10. The use of spirally positioned spokes 16 further improves the visual lead because it appears that spokes 16 are moving along central shaft 10. Also, this more closely approximates the motion of the traveling cable lead. Another advantage of this configuration is that, as the paddlewheel is rotated, a current 38 is created parallel to the central shaft. This resulting current not only deters fish but also guides them along the paddlewheel device.

Figure 3C:
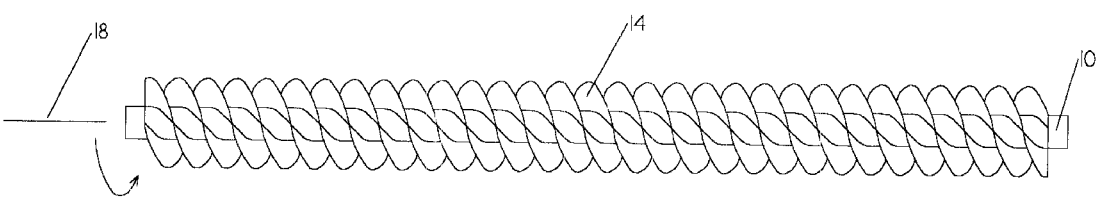
FIG. 3C shows flat vanes in a spiral pattern.

In order to create a greater current 38 parallel to the central shaft 10, FIG. 3C shows flat plate 14 arranged in a spiral pattern around central shaft 10. This arrangement retains the sound deterrent and visual deterrent effects, while producing a stronger guiding current 38 as well as turbulence and sound field 40 along the paddlewheel.

Alternatively, curved plates in a spiral pattern may be used in place of flat plate 14 in a spiral pattern.

Many fish species migrate in the upper portions of the water column. By combining sufficient lengths of paddlewheel 1 across intake 28, a barrier zone of turbulence at the water surface is created, along with a low frequency sound deterrent and visual deterrent, that the fish do not wish to penetrate. Paddlewheel 1 is typically installed at an angle to the turbine intake area. Therefore, the fish swim along the outer edge of turbulence and sound field 40, following the turbine flow downstream along angled paddlewheel 1. This leads the fish to an alternate means of circumventing dam 24 and turbine 26, such as fish bypass 30.

The selection and installation process of a paddlewheel fish deterrent at a hydroelectric site is further explained through the following steps:

1. Baseline data is first obtained from the potential site. This data includes the site geometry, turbine and river flows, typical debris in the river, the acoustic signature of any background noise (such as turbine noise), and the target species to be deterred from the turbine intake. Typical plant operations should also be noted.
2. The location of the paddlewheel is determined by a number of factors. It has to span the turbine intake area with its termination near the location of the fish bypass entrance. If the background noise generated by the turbine is great, it may blanket over any sound deterrent effect created by the paddlewheel. This would require installation of the system further upstream away from the turbine. The angle at which the paddlewheel sets with respect to the intake is primarily determined by turbine and river flows. Bypass effectiveness it typically increased if there is current along the paddlewheel leading fish downstream once they have rejected the sound, visual cues, and turbulence generated by the system.
3. The paddlewheel is sized based on the site data. A combination of hydraulic calculations, lab tests, and past experience ensures the size of the central shaft and vanes can create sufficient turbulence and operate at the given turbine and river flows.
4. The rotation speed of the paddlewheel is calculated based on the target species and its known deterrence frequency. For example, Atlantic salmon smolts are known to elicit an avoidance response at 10 Hz. The rotation speed is also based on the spacing between the vanes and the type of vanes utilized. To achieve an avoidance frequency for Atlantic salmon smolts with a paddlewheel that has vanes spaced at 60°, a rotation speed of 100 rpm would be required.
5. The power source and size necessary to drive the paddlewheel is then determined based on the length, vane spacing and style, and rotation speed of the paddlewheel. The power source may be floating on the water surface or fixed to the shore.
6. After installation of the paddlewheel, the effectiveness of the system should be verified with test fish. If water clarity permits, tagged fish released upstream of the intake and observed in the vicinity of the paddlewheel can provide valuable information. Adjustments in paddlewheel angle and rotation speed based on observations will further improve effectiveness.

ALTERNATE EMBODIMENTS

Figure 4:
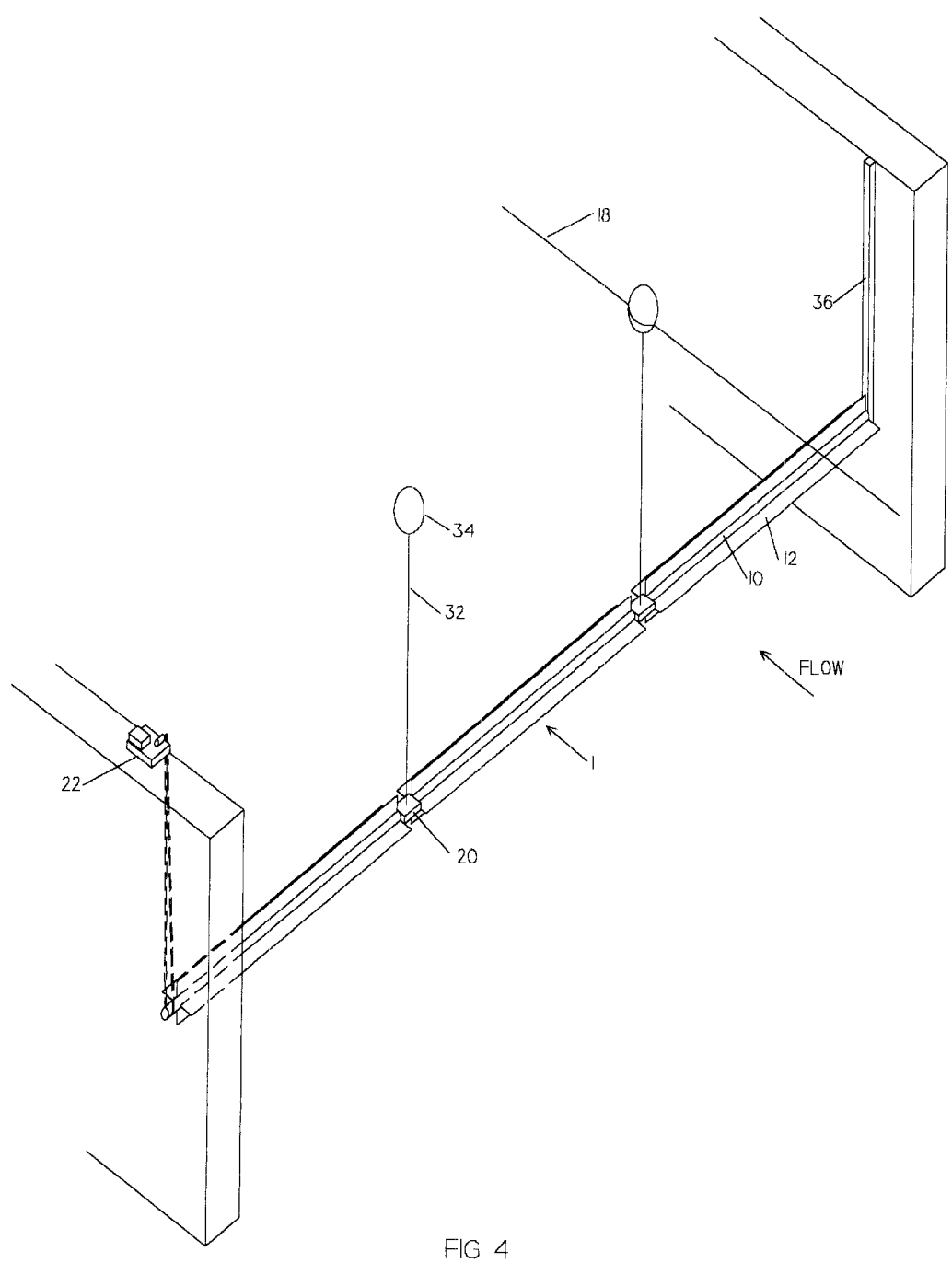
FIG. 4 is a perspective view of the paddlewheel fish deterrent and guide in a submerged application between two piers.

An alternative embodiment of the present invention is explained with reference to FIG. 4. With paddlewheel device 1 positioned at water surface 18, the present invention is primarily aimed at the deterrence and guidance of surface-oriented fish. Alternatively, paddlewheel device 1 may be constructed such that it has slight negative buoyancy. It may then be positioned at some elevation under water surface 18 as determined by the elevation at which the target species of fish is moving. Paddlewheel device 1 is positioned at this elevation by a suspension rope 32 attaching each point between the paddlewheel segments a float 34 at the water surface. Each end of the string of paddlewheels is fixed to a vertical positioning rail 36. Vertical positioning rail 36 is, in turn, fixed to a substantially rigid structure to prevent horizontal movement. Power source 22 may be either submerged or located above water surface 18. Although this embodiment does have the advantage of deterring non surface-oriented fish, it does have some disadvantages. Since the paddlewheel is completely submerged, the vanes do not come in and out of the water, and therefore there is less of a sound deterrent effect. This embodiment is also more difficult to maintain.

Figure 5:
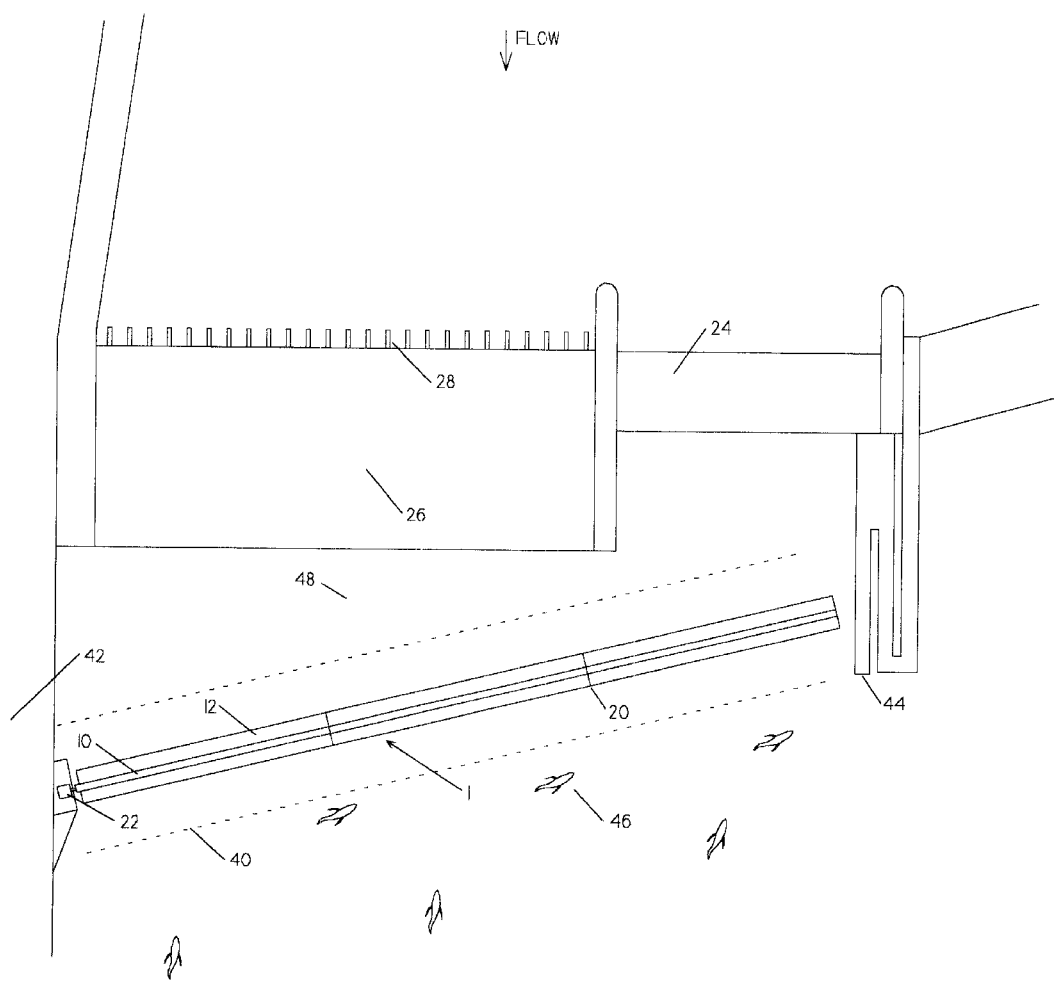
FIG. 5 is a plan view of a hydroelectric site using a paddlewheel fish deterrent and guide to guide upstream migrating fish in the tailrace to a fishway entrance.

FIG. 5 is an additional embodiment showing the guidance of upstream migrating fish 46 to a fishway entrance 44. In most situations, fishway entrance 44 is positioned to one or both sides of the turbine discharge in the area of a tailrace 48. This is so upstream migrating fish 46 traveling upstream will cue on the edge of the turbulence and current created by the turbine discharge and follow this edge to fishway entrance 44. However, the fish become disoriented when the turbines are not operational. In this embodiment, paddlewheel 1 is positioned in tailrace 48 from shore 42 to upstream fishway entrance 44. When paddlewheel 1 is rotated, it creates a defined turbulence and sound field 40 as a lead to upstream fishway entrance 44 regardless of turbine discharge.

CONCLUSION, RAMIFICATIONS, AND SCOPE OF INVENTION

The present invention provides a number of advantages to the field of fish passage:

(a) The invention operates based on a number of behavioral deterrent principles. Therefore, there is a backup if conditions change and one of the deterrents is ineffective. Therefore, this increases the overall bypass effectiveness.

(b) The turbulence and sound fields can easily be adjusted by changing the rotation speed of the paddlewheel.

(c) The turbulence and sound fields are continuous across the turbine intake area. This provides a continuous lead, which is sometimes difficult to obtain with point source sound generators and current inducers.

(d) The system is relatively portable and can easily be deployed for the fish migration period.

(e) The paddlewheel deterrent and guide can also coexist easily with routine hydroelectric plant operations. In many instances, it is difficult to operate fish protection devices because debris in the river damages them, or devices such as screens are clogged by debris. But the creation of turbulence upstream of the paddlewheel keeps most floating debris away from the intake and sluices it down the fish bypass. The paddlewheel will simply "walk over" or "walk under" the large debris that is not influenced by the turbulence.

(f) This system is likely to keep fish in a natural river environment. This results in a reduction of disease transmission from those fish that are crowded during mechanical transport. A natural river environment with no fish interface with mechanical structures reduces impingement and descaling of fish.

(g) The area in which the paddlewheel is typically deployed (upstream of a dam) is in relatively slow moving, deep water in relation to the rest of the river. These river conditions can result in sub optimum conditions for the fish. This can be partially alleviated by installation of a paddlewheel device because it increases the dissolved oxygen and reduces thermal stratification in the vicinity of the paddlewheel. Also, fish have been known to move along routes of higher dissolved oxygen, which increases the guiding effectiveness of the paddlewheel device.

(h) The invention can be used to guide upstream migrating fish to the area of the fishway entrance regardless of turbine discharge.

Although the above description contains many specificities, these should not be construed as limiting the scope of the invention but as merely providing illustrations of some of the presently preferred embodiments of this invention. Thus the scope of the invention should be determined by the appended claims and their legal equivalents, rather than by the examples given.

We claim:

1. A fish deterrent and guiding device for deterring or guiding fish from certain underwater areas, said device comprising:

at least one shaft;

at least one vane extending radially from said at least one shaft wherein said at least one vane is a continuous, flat sheet portion attached linearly along its length over substantially the entire length of said at least one shaft;

a power source; and a coupling mechanism between said power source and said at least one shaft wherein said coupling mechanism allows said at least one shaft to be positioned at substantially the water surface of said certain underwater areas.

2. The device of claim 1 wherein said at least one shaft includes a second one or more shafts axially connected to each other at their ends and to said at least one shaft forming a plurality of axially-connected shafts.

3. The device of claim 2 wherein said plurality of axially connected shafts includes a universal joint between each of said shafts.

4. The device of claim 1 wherein said at least one shaft is neutrally buoyant.

5. The device of claim 1 wherein said at least one vane is a continuous, flat sheet portion helically attached along its length over substantially the entire length of said at least one shaft.

6. The device of claim 1 wherein said at least one vane is a plurality of curved plates arranged in a spiral about substantially the entire length of said at least one shaft.

7. A device for deterring and guiding fish, said device comprising:

a shaft;

at least one vane extending radially from said shaft;

a power source; and a coupling mechanism between said power source and said at least one shaft wherein said coupling mechanism allows said at least one shaft to be positioned below the water surface of said certain underwater areas.

8. The device of claim 7 wherein said shaft is negatively buoyant.

9. The device of claim 7 wherein said at least one vane is a continuous, flat sheet portion attached linearly along its length over substantially the entire length of said at least one shaft.

10. The device of claim 7 wherein said at least one vane is a continuous, flat sheet portion helically attached along its length over substantially the entire length of said at least one shaft.

11. The device of claim 7 wherein said at least one vane is a plurality of curved plates arranged in a spiral about substantially the entire length of said at least one shaft.

12. A device to deter and guide fish comprising:

a shaft;

a plurality of paddles radially extending from said shaft and along said shaft wherein said plurality of paddles form a segmented, continuous, helical spiral wherein each of said plurality of paddles are an individual segment of said helical spiral;

a power source; and a coupling component connecting said shaft to said power source wherein said coupling component positions said shaft substantially at the water surface or below the water surface.

13. The device of claim 12 wherein said paddles are curved.

* * * * *